United States Patent [19]

Yamaguchi

[11] Patent Number: 5,592,303

[45] Date of Patent: Jan. 7, 1997

[54] IMAGE COMMUNICATION APPARATUS AND METHOD WHICH EXTRACTS AND RECORDS IMAGES ON THE TRANSMISSION SIDE

[75] Inventor: Shoichi Yamaguchi, Kawasaki, Japan

[73] Assignee: Canon Kabushiki Kaisha, Tokyo, Japan

[21] Appl. No.: 573,749

[22] Filed: Dec. 18, 1995

Related U.S. Application Data

[63] Continuation of Ser. No. 200,503, Feb. 23, 1994, abandoned.

[30] Foreign Application Priority Data

Feb. 24, 1993 [JP] Japan .................................. 5-059566
Feb. 17, 1994 [JP] Japan .................................. 6-043232

[51] Int. Cl.$^6$ ............................................ H04N 1/387
[52] U.S. Cl. ............................ 358/435; 358/438; 358/453
[58] Field of Search ..................................... 358/450, 452, 358/453, 451, 447, 448, 434–435, 436–438; 395/146, 161; 348/601; 382/175, 176; H04N 1/387

[56] References Cited

U.S. PATENT DOCUMENTS 4,977,463  12/1990  Fukuda .
4,987,497  1/1991   Yoshimura ................................ 358/453
5,280,366  1/1994   Arake ....................................... 358/453
5,317,417  5/1994   Yamamura et al. ..................... 358/451
5,321,531  6/1994   Hasebe et al. .
5,535,015  7/1996   Yoshida ................................... 358/438

*Primary Examiner*—Kim Vu
*Attorney, Agent, or Firm*—Fitzpatrick, Cella, Harper & Scinto

[57] ABSTRACT

A facsimile apparatus comprises a reading unit such as an image sensor to read an image of an original to be transmitted, a transmitter to transmit the image read by the image sensor, an extraction circuit to extract the image in an area shown by a mark written by a marker pen in the image which was read by the image sensor and is transmitted by the transmitter, a memory to store the image extracted by the extraction circuit, a detector to detect that a predetermined amount of image was stored in the memory; and a recorder such as a printer to print the image stored in the memory in accordance with the detection of the detector. The extraction circuit detects the presence or absence of the mark in the predetermined area on the original and extracts the image on the line at which the mark was detected.

36 Claims, 11 Drawing Sheets

FIG. 4

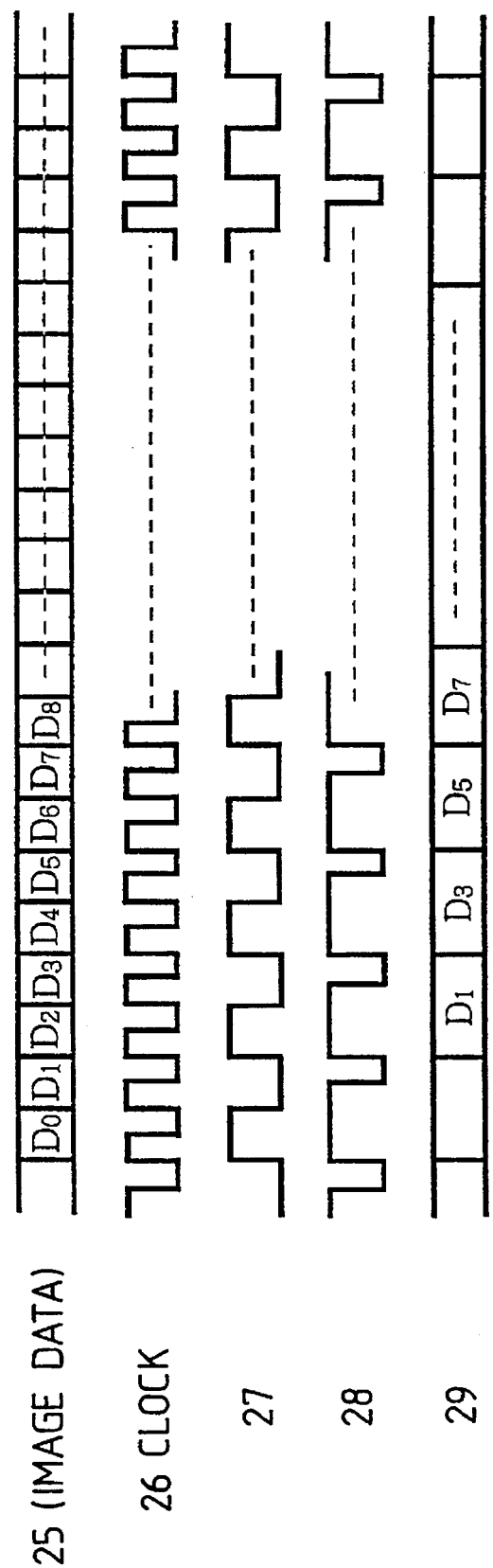

FIG. 9

FACSIMILE TRANSMISSION RESULT REPORT (91)

| RECEPTION SIDE TELEPHONE No. | RECEPTION SIDE NAME | START TIME | COMMUNICATION TIME | PAGE | TRANSMISSION RESULT |
|---|---|---|---|---|---|
| 9876-5432 | TOKYO MAIN OFFICE | 15:34 | 3' 24" | 17 | OK |

TRANSMISSION COMPLETION IMAGE TABLE (92)

| INSURED PERSON NAME (KATAKANA) | APPLICATION SEAL | SEX | DATE | INSURANCE AMOUNT RECIPIENT NAME (KATAKANA) | PERSONAL RELATIONSHIP CODE | RECEIPT RATIO (%) |
|---|---|---|---|---|---|---|
| O YAMADA TARO | SEAL | MALE | S 27 1 29 | YAMADA HANAKO | 02 | 100 |
| O SUZUKI JIRO | SEAL | MALE | S 27 1 29 | SUZUKI KAZUKO | 02 | 100 |
| O SATO GORO | SEAL | MALE | S 27 1 29 | SATO YONE | 02 | 100 |
| O ITOH KENJI | SEAL | MALE | S 27 1 29 | ITOH TOMOKO | 02 | 100 |
| O OKADA MAMORU | SEAL | MALE | S 27 1 29 | OKADA YUMIKO | 02 | 100 |
| O SAWADA KENICHI | SEAL | MALE | S 27 1 29 | SAWADA MASAKO | 02 | 100 |
| O OHTA JUNICHI | SEAL | MALE | S 27 1 29 | OHTA JUNKO | 02 | 100 |
| O TANAKA KUNIO | SEAL | MALE | S 27 1 29 | TANAKA KUNIKO | 02 | 100 |
| O HUKADA TAKEHARU | SEAL | MALE | S 27 1 29 | HUKADA YOUKO | 02 | 100 |
| O NAOI YUJI | SEAL | MALE | S 27 1 29 | NAOI YUKO | 02 | 100 |
| O MATSUMOTO TAKAKO | SEAL | FEMALE | S 27 1 29 | MATSUMOTO TAKAHIRO | 02 | 100 |
| O MURAYAMA TOMIKO | SEAL | FEMALE | S 27 1 29 | MURAYAMA TOMIO | 02 | 100 |
| O MOCHIZUKI KEIJI | SEAL | MALE | S 27 1 29 | MOCHIZUKI KEIKO | 02 | 100 |
| O OHTANI KOJI | SEAL | MALE | S 27 1 29 | OHTANI SADAKO | 02 | 100 |
| O TAKAHASHI SHINICHI | SEAL | MALE | S 27 1 29 | TAKAHASHI JUNKO | 02 | 100 |
| O OSAKO KENJI | SEAL | MALE | S 27 1 29 | OSAKO AYUMI | 02 | 100 |
| O NAKAMURA YASUSHI | SEAL | MALE | S 27 1 29 | NAKAMURA YASUKO | 02 | 100 |

FACSIMILE TRANSMISSION RESULT REPORT

| RECEPTION SIDE TELEPHONE No. | RECEPTION SIDE NAME | START TIME | COMMUNICATION TIME | PAGE | TRANSMISSION RESULT |
|---|---|---|---|---|---|
| 9876-5432 | TOKYO MAIN OFFICE | 15:34 | 3' 24" | 11 | OK |

TRANSMISSION COMPLETION IMAGE TABLE

| INSURED PERSON NAME (KATAKANA) | APPLICATION SEAL | SEX | DATE | INSURANCE AMOUNT RECIPIENT NAME (KATAKANA) | PERSONAL RELATIONSHIP CODE | RECEIPT RATIO (%) |
|---|---|---|---|---|---|---|
| 0 YAMADA TARO | SEAL | MALE/FEMALE | S27 1 29 | YAMADA HANAKO | 02 | 100 |
| 0 SUZUKI JIRO | SEAL | MALE/FEMALE | S27 1 29 | SUZUKI KAZUKO | 02 | 100 |
| 0 SATO GORO | SEAL | MALE/FEMALE | S27 1 29 | SATO YONE | 02 | 100 |
| 0 ITOH KENJI | SEAL | MALE/FEMALE | S27 1 29 | ITOH TOMOKO | 02 | 100 |
| 0 OKADA MAMORU | SEAL | MALE/FEMALE | S27 1 29 | OKADA YUMIKO | 02 | 100 |
| 0 SAWADA KENICHI | SEAL | MALE/FEMALE | S27 1 29 | SAWADA MASAKO | 02 | 100 |
| 0 OHTA JUNICHI | SEAL | MALE/FEMALE | S27 1 29 | OHTA JUNKO | 02 | 100 |
| 0 TANAKA KUNIO | SEAL | MALE/FEMALE | S27 1 29 | TANAKA KUNIKO | 02 | 100 |
| 0 HUKADA TAKEHARU | SEAL | MALE/FEMALE | S27 1 29 | HUKADA YOUKO | 02 | 100 |
| 0 NAOI YUJI | SEAL | MALE/FEMALE | S27 1 29 | NAOI YUKO | 02 | 100 |
| 0 MATSUMOTO TAKAKO | SEAL | MALE/FEMALE | S27 1 29 | MATSUMOTO TAKAHIRO | 02 | 100 |

| RECEPTION SIDE TELEPHONE No. | RECEPTION SIDE NAME | START TIME | COMMUNICATION TIME | PAGE | TRANSMISSION RESULT |
|---|---|---|---|---|---|
| 1234-5678 | OSAKA BRANCH | 15:50 | 1' 24" | 6 | OK |

TRANSMISSION COMPLETION IMAGE TABLE

| INSURED PERSON NAME (KATAKANA) | APPLICATION SEAL | SEX | DATE | INSURANCE AMOUNT RECIPIENT NAME (KATAKANA) | PERSONAL RELATIONSHIP CODE | RECEIPT RATIO (%) |
|---|---|---|---|---|---|---|
| 0 MURAYAMA TOMIKO | SEAL | MALE/FEMALE | S27 1 29 | MURAYAMA TOMIO | 02 | 100 |
| 0 MOCHIZUKI KEIJI | SEAL | MALE/FEMALE | S27 1 29 | MOCHIZUKI KEIKO | 02 | 100 |
| 0 OHTANI KOJI | SEAL | MALE/FEMALE | S27 1 29 | OHTANI SADAKO | 02 | 100 |
| 0 TAKAHASHI SHINICHI | SEAL | MALE/FEMALE | S27 1 29 | TAKAHASHI JUNKO | 02 | 100 |
| 0 OSAKO KENJI | SEAL | MALE/FEMALE | S27 1 29 | OSAKO AYUMI | 02 | 100 |
| 0 NAKAMURA YASUSHI | SEAL | MALE/FEMALE | S27 1 29 | NAKAMURA YASUKO | 02 | 100 |

IMAGE COMMUNICATION APPARATUS AND METHOD WHICH EXTRACTS AND RECORDS IMAGES ON THE TRANSMISSION SIDE

This application is a continuation, of Application Ser. No. 08/200,503 filed Feb. 23, 1994.

BACKGROUND OF THE INVENTION

1. Field of the Invention

The present invention relates to an image communicating apparatus in which a part of an image of a transmitted original is recorded on the transmission side.

2. Related Background Art

In association with the development of facsimile apparatuses, the number of cases of communicating a large quantity of important documents by using the facsimile apparatus is increasing. For example, there is a case where slips, bonds, or the like are transmitted from each branch office to a center in a group.

In such a case, a staff member of each branch records information onto a ledger or the like with respect to whether the important document was transmitted to the center and to which center the important document was transmitted.

However, there is a problem such that the work to write such information onto the ledger is very tedious and may be recorded erroneously.

There is also a problem such that when the facsimile apparatus conveys the documents and reads them by a reading section, if the documents are overlappingly conveyed, the documents which are hidden by the document on the reading section among the documents which were overlappingly conveyed are not read but are delivered to the outside of the apparatus without performing any process, so that the images of those documents are not transmitted in spite of the fact that the staff member believes that he has transmitted those important documents.

SUMMARY OF THE INVENTION

It is an object of the invention to provide an image communicating apparatus which can solve the above problems.

Another object of the invention is to provide an image communicating apparatus in which the staff member on the transmission side can recognize a transmitted original.

Still another object of the invention is to provide an image communicating apparatus in which part of the images of the transmitted original can be recorded on the transmission side.

The above and other objects and features of the present invention will become apparent from the following detailed description and the appended claims with reference to the accompanying drawings.

BRIEF DESCRIPTION OF THE DRAWINGS

FIG. 4 is a diagram showing an example of an original with a marker which is used in the facsimile apparatus of the first embodiment;

FIG. 8 is a timing chart showing the operation of the magnification circuit of FIG. 6;

FIG. 9 is a diagram showing a list which was printed out;

FIG. 11 is a diagram showing a list which was printed out.

DETAILED DESCRIPTION OF THE PREFERRED EMBODIMENTS

Embodiments of the present invention will now be described with reference to the drawings.

[First Embodiment]

Figure 1:
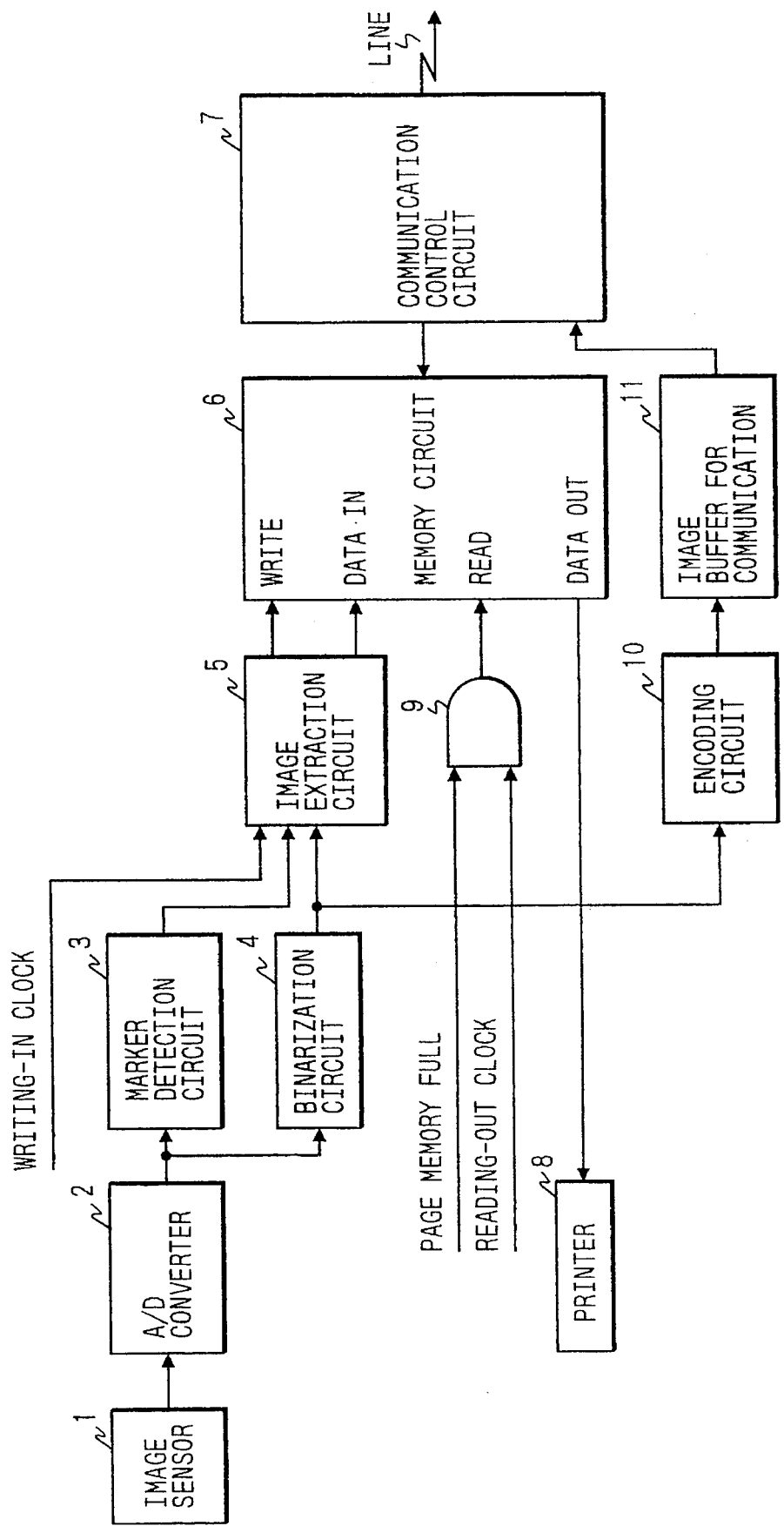
FIG. 1 is a block diagram showing a schematic construction of a facsimile apparatus according to the first embodiment of the invention.

FIG. 1 is a block diagram showing a schematic construction of a facsimile apparatus according to the first embodiment of the invention. In the diagram, reference numeral 1 denotes a contact type image sensor (reading means) as a device for reading the contents of an original and converting the read contents into analog image data as an electric signal; 2 denotes an A/D conversion circuit (A/D converter) which is connected to an output line of the image sensor 1 and which converts analog image data into digital image data; 3 denotes a marker detection circuit which is connected to an output line of the A/D conversion circuit 2 and refers to the digital image data and detects a portion (marker) which was marked in an area (marker display area) existing by a predetermined width, for example, from the left side edge of the original to the right side each; 4 denotes a binarization circuit which is connected to the output line of the A/D conversion circuit 2 and which converts digital image data into white and black pixels; and 5 denotes an image extraction circuit (image data extracting means) which is connected to a CPU (central processing unit: not shown) and the output lines of the marker detection circuit 3 and binarization circuit 4 and which selectively extracts the image data corresponding to a scanning line in, for example, the lateral direction (main scanning direction) on the original whose marker was detected by the marker detection circuit 3 from an output signal of the binarization circuit 4. A writing-in clock signal as a sync signal is supplied from the CPU to the image extraction circuit 5.

Reference numeral 6 denotes a memory circuit (image data storing means) which is connected to an output line of the image extraction circuit 5 and stores the extracted image data on the line unit basis on the basis of an instruction signal supplied from the image extraction circuit 5; 7 denotes a communication control circuit which is connected to the memory circuit 6 and executes all of control processes regarding the communication; 8 denotes a printer (image data output means) which is connected to an output line of the memory circuit 6 and prints the stored image data; and 9 denotes a gate which is connected to the CPU and instructs the memory circuit 6 to read out the stored data on the basis of a page memory full signal, which will be explained below, and a reading-out clock signal as a sync signal which are supplied from the CPU.

Reference numeral 10 denotes an encoding circuit for encoding the image data from the binarization circuit 4 by a specific system; and 11 denotes an image buffer for communication for temporarily holding encoded data from the encoding circuit 10, for outputting to the communication control circuit 7, and for transmitting the image data.

Figure 2:
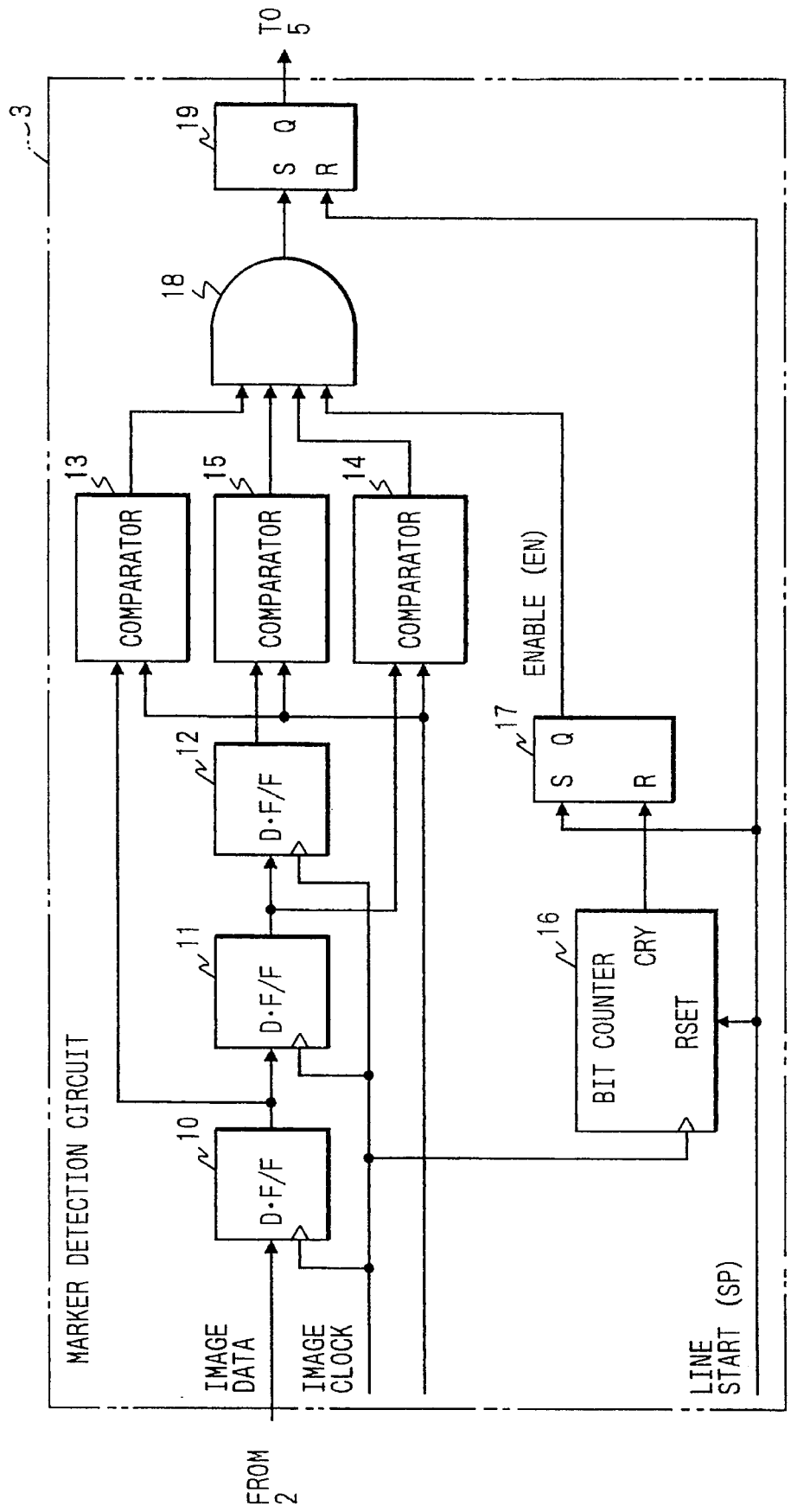
FIG. 2 is a block diagram showing an internal construction of a marker detection circuit in the facsimile apparatus of FIG. 1.

FIG. 2 is a block constructional diagram showing the detail of the marker detection circuit 3. In the diagram, reference numerals 10, 11, and 12 denote first, second, and third D-type flip-flops, each having four input/output bits which are serially connected. The flip-flops 10 through 12 are connected to the CPU, and an image clock signal, as a sync signal, is supplied from the CPU to each of those flip-flops. The first D-type flip-flop 10 is connected to the output line of the A/D conversion circuit 2 in FIG. 1 and delays the digital image data which is supplied from the A/D conversion circuit 2, by a time corresponding to one image clock at a time, and sequentially transmits the delayed data to the second and third D-type flip-flops 11 and 12.

Reference numerals 13, 14, and 15 denote first, second, and third 4-bit comparators which are connected in parallel. Each of the comparators 13 through 15 is connected to the CPU and receives a threshold level signal as a signal indicative of a specific value, which will be explained below, from the CPU. The first comparator 13 is conencted to a connection line of the first and second D-type flip-flops 10 and 11. The second comparator 14 is connected to a connection line of the second and third D-type flip-flops 11 and 12. The third comparator 15 is connected to an output line of the third D-type flip-flop 12.

Reference numeral 16 denotes a bit counter which is connected to the CPU and counts up by the image clock signal which is supplied from the CPU. The bit counter 16 resets the counting operation by a line start pulse signal (SP) indicative of the start of the scanning for each scanning line and generates a carry signal (CRY) to a first SR-type flip-flop 17 when a count value reaches a predetermined value, which will be explained below. A reset terminal of the first SR-type flip-flop 17 is connected to the CPU and a CRY terminal of the bit counter 16. The flip-flop 17 is set by the SP signal which is supplied from the CPU and is reset by the CRY signal which is supplied from the bit counter 16. The flip-flop 17 generates an enable signal (EN), which will be explained below, to an AND gate 18 for a time interval in the set state. The AND gate 18 is connected to output lines of the first through third comparators, 13 through 15, and to the first SR-type flip-flop 17 and gets the AND of output signals of them and generates a signal to a set terminal of a second SR-type flip-flop 19. The SP signal from the CPU is connected to a reset terminal of the flip-flop 19. An output line of the AND gate 18 is connected to the set terminal of the flip-flop 19. The flip-flop 19 is reset by the SP signal supplied from the CPU and is set by the output signal from the AND gate 18. The flip-flop 19 generates a marker detection signal, which will be explained below, to the first image extraction circuit 5 for a time interval in the set state.

The operation of the facsimile apparatus, with the above construction shown in FIGS. 1 and 2, will now be described.

It is now assumed that a large quantity of originals have been set on a reading document feeding plate (not shown). The image sensor 1 scans every line of the original from the left to the right and generates a potential according to the luminance of a reflected light of a light source which irradiated the original. In recent years, since an image sensor module in which a photoelectric converting device, an amplifying circuit, a light source, and the like are integratedly constructed has been commercially available and well known, the description regarding the operation of the detailed portion is omitted here.

The A/D converter 2 performs various kinds of correcting processes, such as shading correction and the like, to the analog image data, which is input from the image sensor 1, and also converts the image data into image data of the digital value (pixel value) of about four bits (16 values). The pixel value is increased or decreased by a change in gradation of the analog image data. It is now assumed that, for example, the pixel value of 0 indicates black and the pixel value of 15 denotes white and pixel values of 1 to 14 indicate gray colors of respective densities.

When the marker detection circuit 3 judges that there is a mark in the marker display area with reference to the image data supplied from the A/D converter 2, the marker detection circuit generates a marker detection signal to instruct that the image data corresponding to the scanning line is written into the memory circuit 6 to the image extraction circuit 5.

The practical operation of the marker detection circuit 3 will now be described with reference to FIGS. 1, 2, and 3.

Figure 3:
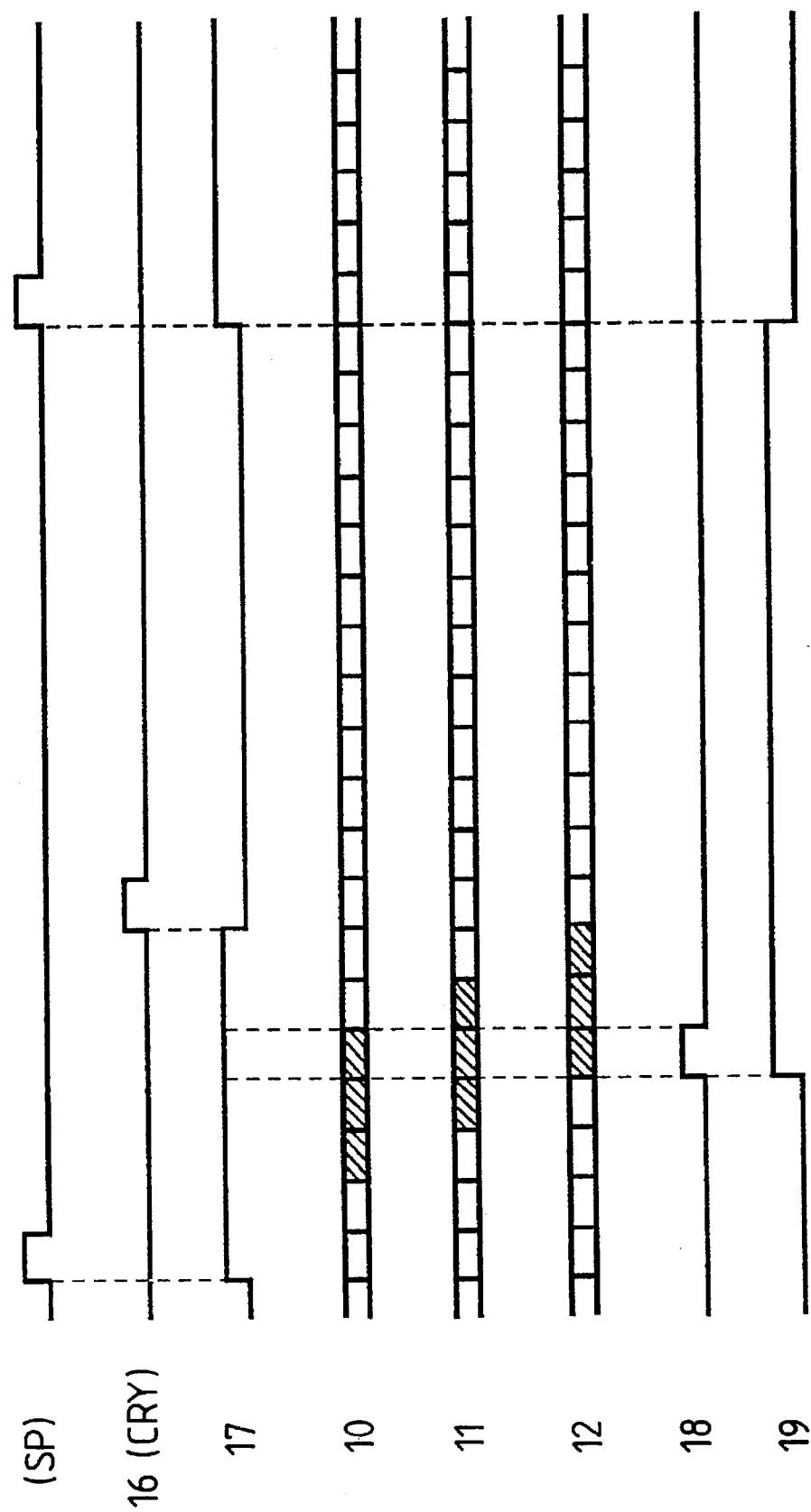
FIG. 3 is a timing chart showing the operation of the detection circuit in FIG. 2.

FIG. 3 is a timing chart of the operation of the marker detection circuit 3. Each reference numeral written on the left side of the diagram corresponds to each of the output devices shown in FIG. 2.

The 4-bit digital image data as an output of the A/D converter 2 is sequentially input to the first through third D-type flip-flops 10, 11, and 12 and their output signals are sequentially compared with the pixel values (specific values) of the threshold level signals by the first through third comparators 13, 14, and 15, respectively. When the pixel value of the input image data is smaller (namely, blackish) than the specific value as a result of the comparison, each of the first to third comparators 13 through 15 sets the output signal of each comparator to the high level. Therefore, in the case where at least three pixels whose values are smaller than the specific value on each scanning line are continued, all of the output signals of the first through third comparators 11 through 13 are set to the high level.

The bit counter 16 starts to count the number of pixels by a scanning start section of each scanning line on the basis of the SP signal from the CPU and outputs the CRY signal to the first SR-type flip-flop 17 when the count value reaches a predetermined value, thereby resetting the flip-flop 17. The pixel count value to output the CRY is arbitrarily set. However, for example, in the case where an area for an interval of 2 cm from the left side edge of the original to the right edge side is set to a marker display area and the scanning line in which three pixels whose values are smaller than the threshold value continuously exist in such a marker display area is set to the scanning line designated by the marker, the pixel count value can be obtained by the following equation.

(pixel count value to output the CRY)

=2 [cm]/(size of one pixel [dot·cm])

=2 [cm]·(resolution [dots/cm])

The first SR-type flip-flop 17 outputs the EN signal to the AND gate 18 for a period of time (enable period) until the CRY signal is input after the SP signal was input. In the case where three image data of the pixel values smaller than the threshold value are continuously input to the first D-type flip-flop 10 for the above enable period of time during which the EN signal is supplied to the AND gate 18, the AND gate 18 sets the signal which is supplied to a set terminal of the second SR-type flip-flop 19 to the high level. The second SR-type flip-flop 19 continuously outputs the marker detection signal to the image extraction circuit 5 for a period of time from a timing at which the output signal of the AND gate 18 was set to the high level until a timing at which the scanning to the next scanning line is started and the SP signal is newly input.

The binarization circuit 4 converts the digital image data having gradations of multivalues into the binary image data of black or white pixel. As a binarizing method, there is a simple binarizing method of deciding black or white pixel by simply comparing with the threshold value, a dither method as one of pseudo half tone processing methods, an error diffusion method, or the like. However, any one of those methods can be used.

The encoding circuit 10 encodes the binary data from the binarization circuit 4 by an encoding method of MH, MR, or MMR as a standard encoding method of a facsimile or the like and transfers the encoded data to the image buffer 11 for communication.

After the line was connected, the communication control circuit 7 executes a predetermined facsimile communication procedure and, after that, transmits the encoded data held in the image buffer 11 to a facsimile apparatus on the reception side.

As mentioned above, the image in the area designated by the marker is accumulated into the memory circuit 6 while transmitting the image of the original read out by the image sensor by the communication control circuit 7.

The output signal from each of the marker detection circuit 3 and binarization circuit 4 is input to the image extraction circuit 5. The image extraction circuit 5 supplies the binary image data which is output from the binarization circuit 4 to a DATA IN terminal of the memory circuit 6 and supplies a memory write signal to a WRITE terminal of the memory circuit 6 for a period of time during which the marker detection signal is output from the marker detection circuit 3.

When the image data of one page of an output paper is stored into the memory circuit 6, the page memory full signal is generated from the CPU and input to the gate 9. A signal to instruct the memory circuit 6 to read out the stored image data is output from the gate 9, so that the stored image data is printed and output by the printer 8.

Figure 4:
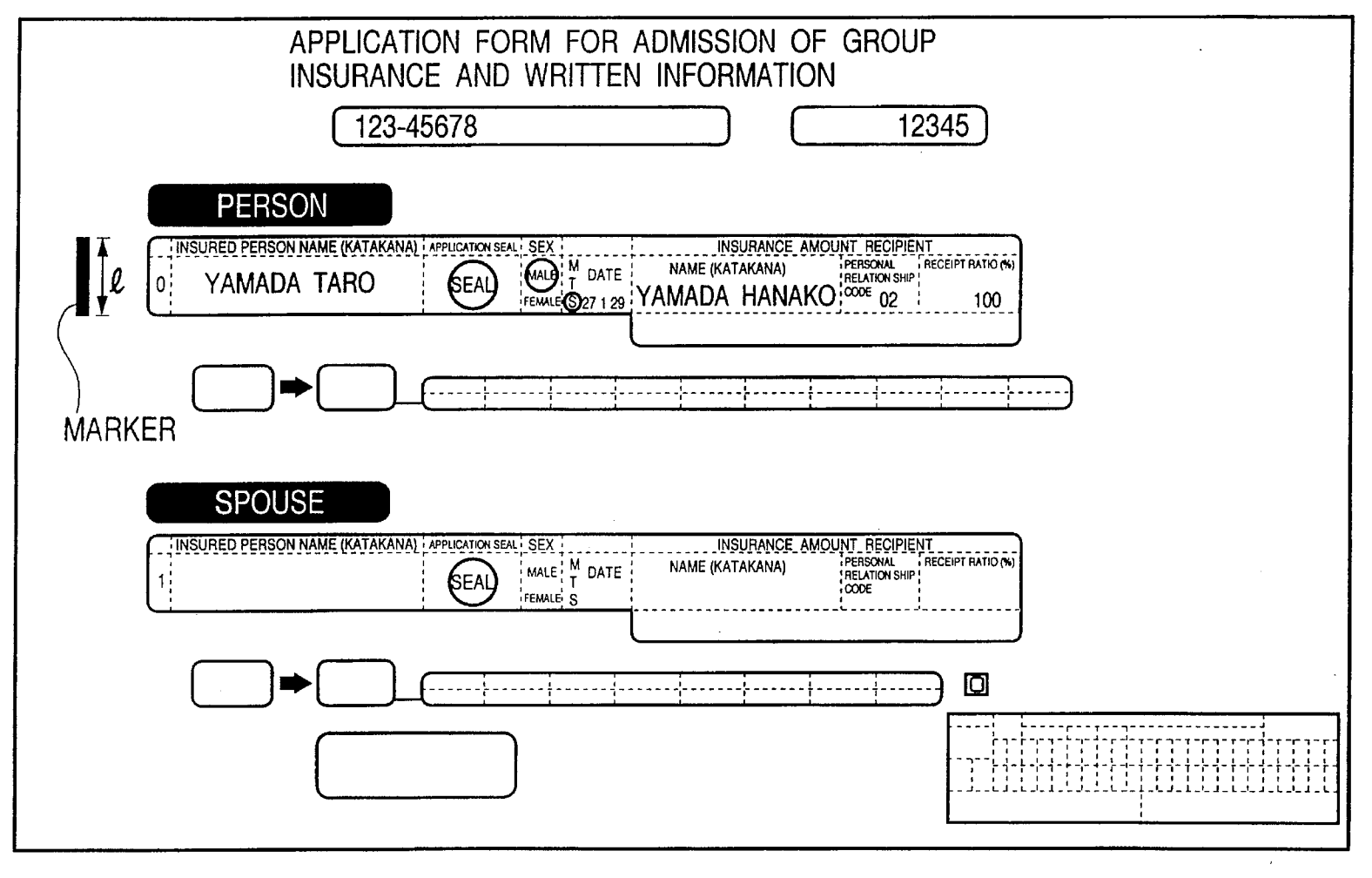

FIG. 4 shows an application form for insurance as an example of an original to be read and is characterized in that a marker "l" has previously been printed at the left position of the applicant name column. A range in the vertical direction of the portion which is designated in the contents of the original of FIG. 4 is determined by a length l in the vertical direction of the marker.

After a number of written application forms were set onto the document feeding plate of the facsimile apparatus according to the first embodiment, when the transmitting operation is executed, only the applicant name column is extracted from each application form from the line corresponding to the marked length l and stored into the memory circuit 6. The applicant name column of each application form which was normally read and transmitted is printed out as a list by the printer 8.

[Second Embodiment]

The second embodiment of the present invention will now be described with reference to FIGS. 5 to 8.

Figure 5:
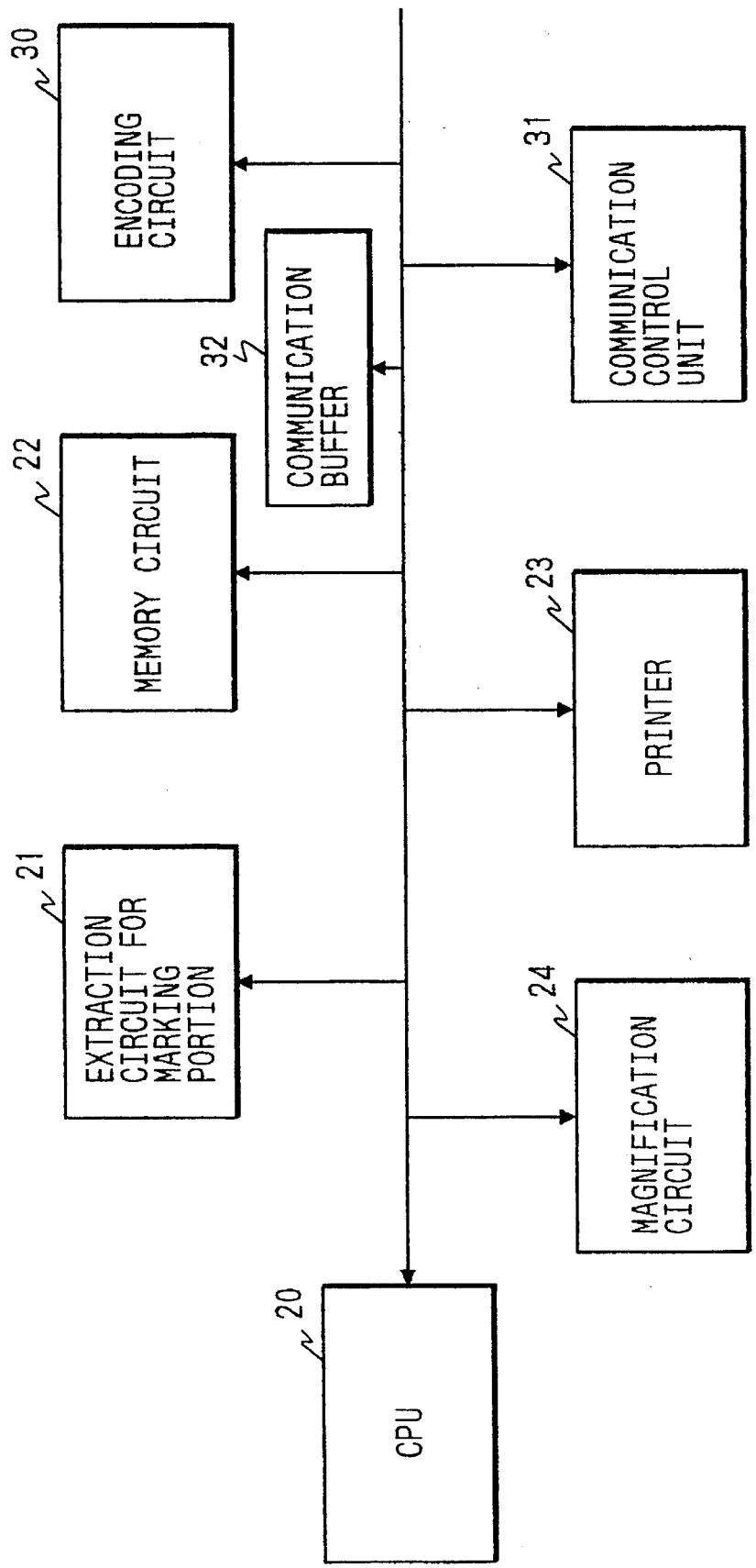
FIG. 5 is a block diagram showing a schematic construction of a facsimile apparatus according to the second embodiment of the invention.

FIG. 5 is a block diagram showing a schematic construction of a facsimile apparatus according to the second embodiment of the invention.

Each section in FIG. 5 is mutually connected by signal lines. In the diagram, reference numeral 20 denotes a CPU which controls each circuit shown in FIG. 5; 21 denotes an extraction circuit for a marking portion including the contact type image sensor 1, A/D converter 2, marker detection circuit 3, binarization circuit 4, and image extraction circuit 5 all shown in FIG. 1; 22 denotes a memory circuit to store the image data; 23 denotes a printer; and 24 denotes a magnification circuit to reduce the image data stored in the memory circuit 22.

Reference numeral 30 denotes an encoding circuit for encoding the image data for transmission from the binarization circuit 4 in the marking portion extraction circuit 21 by a predetermined method; 32 denotes an image buffer for communication to temporarily hold the encoded data from the encoding circuit 30; and 31 denotes a communication control unit to perform all of the controls regarding the communication.

Figure 6:
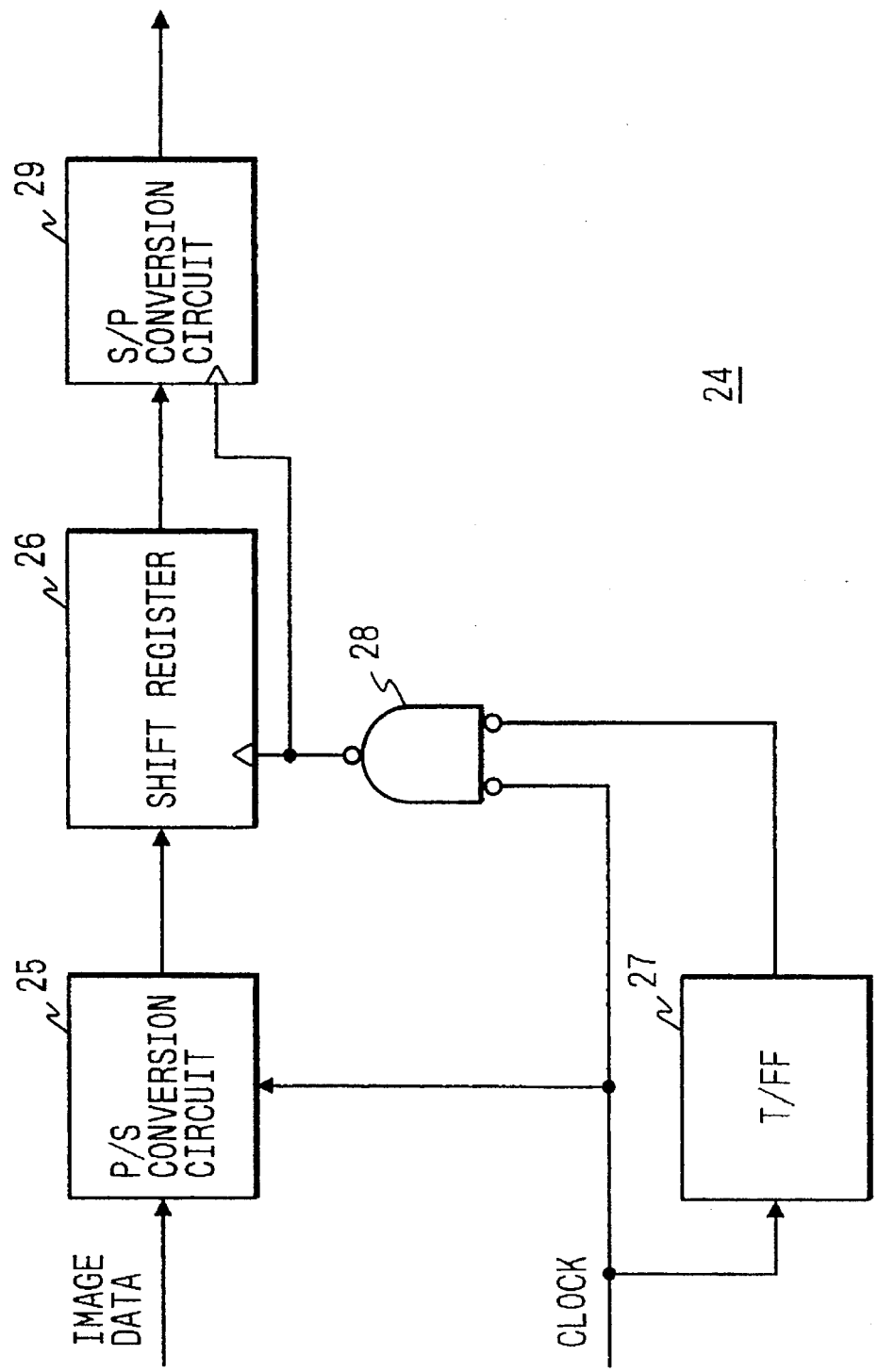
FIG. 6 is a block diagram showing an internal construction of a magnification circuit in the facsimile apparatus of FIG. 5.

FIG. 6 is an internal constructional diagram of the magnification circuit 24. In the diagram, reference numeral 25 denotes a P/S conversion circuit, which is connected to the memory circuit 22 in FIG. 5, and which converts the parallel image data supplied from the memory circuit 22 into serial data; 26 denotes a shift register which is connected to output lines of the P/S conversion circuit 25 and an OR gate 28 and shifts the image data supplied from the P/S conversion circuit 25 to the right; 27 denotes a T-type flip-flop which is connected to the CPU 20 in FIG. 5 and which converts a period of the clock signal which is supplied from the CPU 20 to a double period and outputs; 28 denotes the OR gate for controlling an output of the shift register 26 on the basis of the clock signal which is supplied from the CPU 20 and a signal which is supplied from the T-type flip-flop 27; and 29 denoted an S/P conversion circuit which is connected to the output lines of the shift register 26 and OR gate 28, and which converts the serial image data which is input from the shift register 26 into parallel data.

The operation of the facsimile apparatus according to the second embodiment will now be described with reference to FIGS. 5, 6, and 7.

Figure 7:
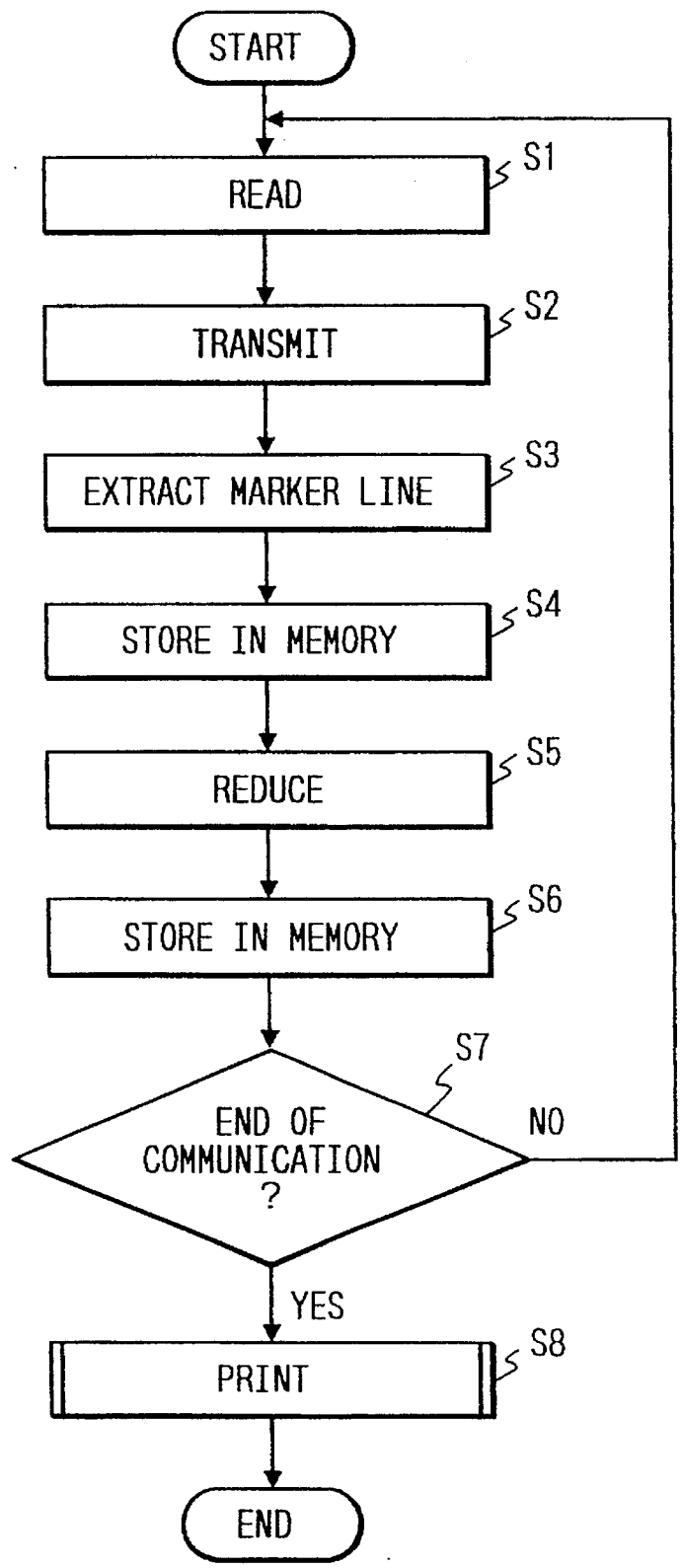
FIG. 7 is a flowchart showing the control operation of a CPU in the facsimile apparatus of FIG. 5.

FIG. 7 is a flowchart showing a control procedure which is executed by the CPU 20 in FIG. 5.

In the diagram, first, the image on the original is read in step S1. In step S2, the communication control unit 31 is activated and the encoded image data which was encoded by the encoding circuit 30, on the basis of a standard encoding method of the facsimile apparatus, and which was transferred to the image buffer 32, is subjected to a predetermined facsimile communication procedure, and a reception side telephone number, a reception side name, a communication start time, and the like are stored into the memory circuit 22. The image data is then transmitted to the reception side facsimile apparatus.

In step S3, the image data on the marked scanning line on the reading original is extracted, by the marking portion extraction circuit 21, by the same method as that in the first embodiment described above. In step S4, extracted image data is stored into the memory circuit 22.

In step S5, the magnification circuit 24 is activated and the image data of the marking portion stored in step S4 is reduced into ½.

A reducing algorithm in this instance can be arbitrarily used. In the second embodiment, however, the reducing process is executed by a simple thinning-out process, to extract the image data at a ratio of one pixel per two pixels, with respect to the main scanning direction (i.e. the lateral direction of the original) and the sub scanning direction (vertical direction of the original).

The practical operation of the reducing process in the main scanning direction, which is executed in the magnification circuit 24 in step S5, will now be described with reference to FIG. 8.

FIG. 8 is a timing chart for the above described processing operation of the magnification circuit 24 and each reference numeral written on the left side in the diagram corresponds to each output device in FIG. 6.

The 8-bit parallel data transferred from the memory circuit 22 is converted into serial data by the P/S conversion circuit 25. An operation clock in the magnification circuit 24 is converted into the waveform of one clock per two pixels, as shown at reference numeral 28 in FIG. 8, by the T-type flip-flop 27 and the OR gate 28 and is input to the shift register 26. On the basis of the output signal from the OR gate 28, the shift register 26 outputs the image data of every other pixel from the image data which is supplied from the P/S conversion circuit 25 as shown at reference numeral 26 in FIG. 8. The image data is subsequently converted into 8-bit parallel data by the S/P conversion circuit 29 and is transferred to the memory circuit 22.

The reducing process in the sub-scanning direction is realized by executing the reducing process in the main scanning direction for every other line.

The image data for which the reducing processes is finished is again transferred and is stored in the memory circuit 22 in step S6. In step S7, a determination is made to see if the transmission of all of the originals is finished. If YES, the communicating time, the number of originals, the communication result, and the like are written into the memory circuit 22, the printer 23 is activated, and the reduced image data stored in the memory circuit 22 is printed in step S8. When a determination is made in step S7 that the transmission of all of the original images has not yet been finished, the processing routine is returned to step S1.

Figure 10:
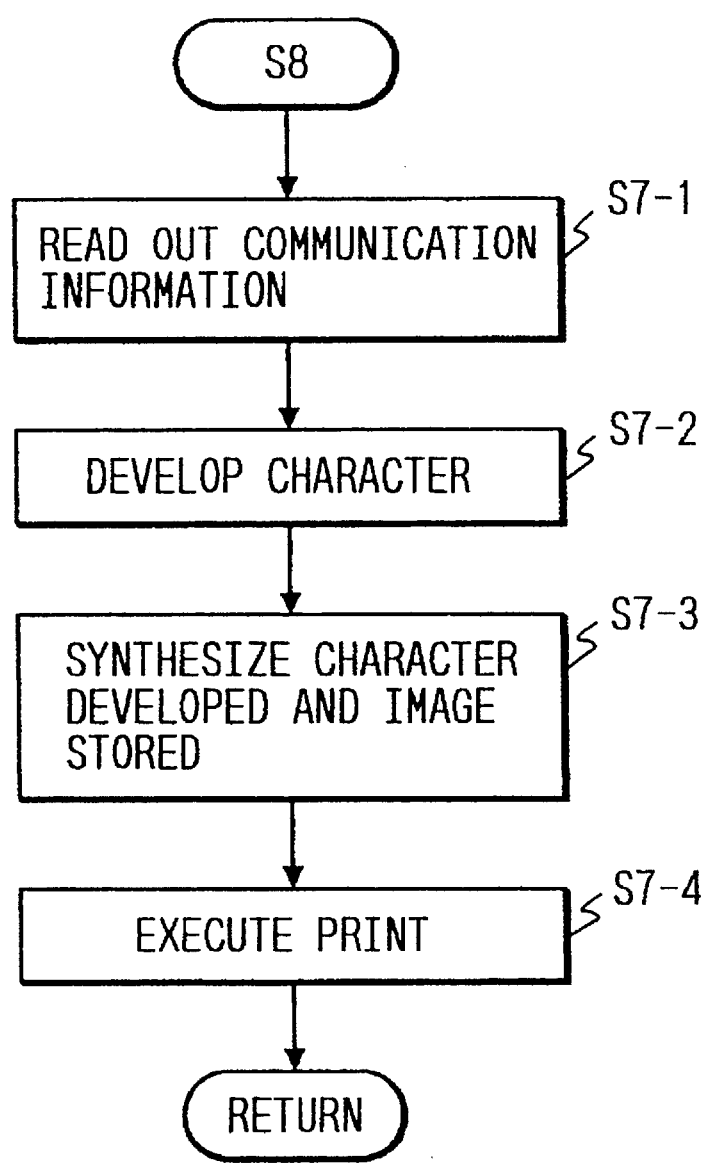
FIG. 10 is a detailed flowchart of step S8 in FIG. 7.

FIG. 10 is a flowchart showing in further detail the control procedure which is executed by the CPU 20 in the printing execution step S8 in the flowchart of FIG. 7. First, in step S7-1, the information regarding the communication, such as reception side telephone number, reception side name, communication start time, communication time, the number of originals, communication result, and the like, which have already been stored in the memory circuit 22, is read out. Since that information can be obtained by a conventional facsimile apparatus of a general construction, the descriptions about each of the component elements and functions which are necessary for them are omitted here.

Subsequently, in step S7-2, the information read out in step S7-1 is converted into character data which can be printed (character development) and is written to a predetermined location in the memory 22 and a ruled-line image is written as necessary (S7-3).

In the last step S7-4, the image data synthesized in step S7-3 is transferred to the printer 23 and is printed out.

FIG. 9 shows an example of a list printed by the flowcharts of FIGS. 7 and 10. The reception side telephone number, reception side name, communication start time, communication time, page, transmission result, and the like (all indicated by reference numeral 91), ruled lines 92 to obtain a good style, and an applicant name column 93, which was extracted from each of the above application forms, and stored are printed on the list.

As shown in FIG. 11, it is also possible to control the apparatus so as to print a plurality of lists for transmission partners on one sheet of paper.

In place of the communication start time, the year, month, and day (date) of the communication can be also printed or both the year, month, and day, and the communication start time can be also printed. In the second embodiment, the image in the area designated by the marker of each original has been stored into the memory and printed. However, it is also possible to construct the apparatus in a manner such that the image in a predetermined area of the first page in each communication is stored into the memory and printed at a predetermined timing.

As mentioned above, the image data which was read out from the original by the reading means and converted into the image data, and which corresponds to a specific portion in the original, is extracted by the image data extracting means, stored in the image data storing means, and the stored image data is output in a group by the image data output means after completion of the transmission. Thus, an original which cannot normally be transmitted due to a double feeding operation of the papers or the like can soon be determined. Particularly, the invention is effective in case of transmitting a large quantity of documents of the same format.

What is claimed is:

1. A facsimile apparatus comprising:

reading means for reading an original having a plurality of pages to provide a respective plurality of image pages;

transmitting means for transmitting the plurality of image pages in a single communication to a facsimile apparatus on a reception side;

extracting means for extracting a partial image from each of the image pages, each partial image existing in an area shown by a mark image corresponding to a mark written by a marker pen on the respective page of the original;

storing means for storing the partial images extracted by said extracting means; and recording means for recording the partial images stored in the storing means on a recording paper.

2. A facsimile apparatus according to claim 1, further comprising detecting means for detecting that a predetermined amount of image data was stored into said storage means, wherein said recording means records the partial images stored in the storing means in accordance with the detection of said detecting means.

3. An apparatus according to claim 1, wherein said recording means adds information of the reception side to which the image pages were transmitted to the partial images stored in said storing means.

4. An apparatus according to claim 3, wherein the information of the reception side is a telephone number of the reception side.

5. An apparatus according to claim 3, wherein the information of the reception side is a name of the reception side.

6. An apparatus according to claim 1, wherein said recording means adds a time at which the single communication was executed to the partial images stored in said storing means.

7. An apparatus according to claim 1, wherein said recording means adds a date at which the single communication was performed to the partial images stored in said storing means.

8. An apparatus according to claim 1, wherein said storing means reduces each partial image extracted by said extracting means before storage.

9. An image communicating apparatus comprising:

reading means for reading of an original having a plurality of pages to provide a respective plurality of image pages;

transmitting means for transmitting the plurality of image pages in a single communication to a facsimile apparatus on a reception side;

extracting means for extracting a partial image from each of the image pages, each partial image existing in a predetermined area in the respective image page;

storing means for storing the partial images extracted by said extracting means; and recording means for recording the partial images stored in said storing means on a recording paper.

10. An apparatus according to claim 9, wherein said storing means reduces each partial image extracted by said extracting means before storage.

11. An apparatus according to claim 9, wherein said storing means stores the partial images of a plurality of communications.

12. An apparatus according to claim 9, wherein said recording means adds information of the reception side to which the image pages were transmitted to the partial images stored in said storing means.

13. An apparatus according to claim 12, wherein the information of the reception side is a telephone number of the reception side.

14. An apparatus according to claim 12, wherein the information of the reception side is a name of the reception side.

15. An apparatus according to claim 9, wherein said recording means adds a time at which the single communication was executed to the partial images stored in said storing means.

16. An apparatus according to claim 9, wherein said recording means adds a date at which the single communication was performed to the partial images stored in said storing means.

17. An image communicating apparatus, comprising:

reading means for reading an original having a plurality of pages to provide a respective plurality of image pages;

transmitting means for transmitting the plurality of image pages in a single communication to a facsimile apparatus on a reception side;

extracting means for extracting a partial image from each of the image pages, each partial image existing in an area shown by a mark image corresponding to a mark written by a marker pen on the respective page of the original;

storing means storing the partial images extracted by said extracting means; and visualizing means for visualizing the partial images stored in said storing means.

18. An image processing method in an image communication apparatus, comprising the steps of:

reading an original having a plurality of pages to provide a respective plurality of image pages;

transmitting the plurality of image pages in a single communication to a facsimile apparatus on a reception side;

extracting a partial image from each of the image pages, each partial image existing in a predetermined area of the respective image page;

storing the extracted partial images; and recording the stored partial images on a recording paper.

19. A method according to claim 18, wherein the storing step reduces each partial image extracted by the extracting step before storage.

20. A method according to claim 18, wherein the storing step stores the partial images of a plurality of communications.

21. A method according to claim 18, wherein the recording step adds information of the reception side to which the image pages were transmitted to the partial images stored in the storing step.

22. A method according to claim 21, wherein the information of the reception side is a telephone number of the reception side.

23. A method according to claim 21, wherein the information of the reception side is a name of the reception side.

24. A method according to claim 18, wherein the recording step adds a time at which the single communication was executed to the partial images stored in the storing step.

25. A method according to claim 18, wherein the recording step adds a date at which the single communication was performed to the partial images stored in the storing step.

26. An image processing method in an image communicating apparatus, comprising the steps of:

reading an original having a plurality of pages to provide a respective plurality of image pages;

transmitting the plurality of image pages in a single communication to a facsimile apparatus on a reception side;

extracting a partial image from each of the image pages, each partial image existing in an area shown by a mark image corresponding to a mark written by a marker pen on the respective page of the original;

storing the partial images extracted in the extracting step; and visualizing the partial images stored in the storing step.

27. An image processing method in an image communicating apparatus, comprising the steps of:

reading an original having a plurality of pages to provide a respective plurality of image pages;

transmitting the plurality of image pages in a single communication to a facsimile apparatus on a reception side;

extracting a partial image from each of the image pages, each partial image existing in an area shown by a mark image corresponding to a mark written by a marker pen on the respective page of the original;

storing the partial images extracted in the extracting step; and recording the partial images stored in the storing step on a recording paper.

28. A method according to claim 27, wherein the recording step adds information of the reception side to which the partial images were transmitted to the image pages stored in the storing step.

29. A method according to claim 28, wherein the information of the reception side is a telephone number of the reception side.

30. A method according to claim 28, wherein the information of the reception side is a name of the reception side.

31. A method according to claim 27, wherein the recording step adds a time at which the single communication was executed to the partial images stored in the storing step.

32. A method according to claim 27, wherein the recording step adds a date at which the single communication was performed to the partial images stored in the storing step.

33. A method according to claim 27, wherein the storing step reduces each partial image extracted in the extracting step before storage.

34. A image processing method according to claim 27, further comprising the step of detecting whether a predetermined amount of image data was stored in the storing step, wherein the recording step records the partial images stored in the storing step in accordance with the result of the detecting step.

35. An image communicating apparatus comprising:

reading means for reading an original having a plurality of pages to provide a respective plurality of image pages;

transmitting means for transmitting the plurality of image pages in a single communication to a facsimile apparatus on a reception side;

extracting means for extracting a partial image from each of the image pages, each partial image existing in a predetermined area in the respective image page;

storing means for storing the partial images extracted by said extracting means; and visualizing means for visualizing the partial images stored in said storing means.

36. An image processing method in an image communicating apparatus comprising the steps of:

reading an original having a plurality of pages to provide a respective plurality of image pages;

transmitting the plurality of image pages in a single communication to a facsimile apparatus on a reception side;

extracting a partial image from each of the image pages, each partial image existing in a predetermined area in the respective image page;

storing the partial images extracted by said extracting step; and visualizing the partial images stored in said storing step.

* * * * *